US012676387B2

(12) United States Patent
Cochard

(10) Patent No.: US 12,676,387 B2
(45) Date of Patent: Jul. 7, 2026

(54) DEVICE FOR CONNECTING A TERMINAL OF A BATTERY MODULE TO AN ELECTRICAL CONDUCTOR

(71) Applicant: A. Raymond et cie, Grenoble (FR)

(72) Inventor: Mathieu Cochard, Grenoble (FR)

(73) Assignee: A. Raymond et Cie, Grenoble (FR)

( * ) Notice: Subject to any disclaimer, the term of this patent is extended or adjusted under 35 U.S.C. 154(b) by 285 days.

(21) Appl. No.: 18/290,922

(22) PCT Filed: Jun. 20, 2022

(86) PCT No.: PCT/FR2022/051195
§ 371 (c)(1),
(2) Date: Jan. 22, 2024

(87) PCT Pub. No.: WO2023/002100
PCT Pub. Date: Jan. 26, 2023

(65) Prior Publication Data
US 2024/0347874 A1 Oct. 17, 2024

(30) Foreign Application Priority Data
Jul. 23, 2021 (FR) ...................................... 2107980

(51) Int. Cl.
*H01M 50/517* (2021.01)
*H01R 4/50* (2006.01)
(Continued)

(52) U.S. Cl.
CPC ........ *H01M 50/517* (2021.01); *H01R 4/5066* (2013.01); *H01R 13/115* (2013.01); *H01R 13/6315* (2013.01)

(58) Field of Classification Search
CPC . H01R 4/5066; H01R 13/115; H01R 13/6315
See application file for complete search history.

(56) References Cited

U.S. PATENT DOCUMENTS

| 9,698,402 B2 * | 7/2017 | Gunther | ................. B23K 31/02 |
| 2014/0248517 A1 * | 9/2014 | Yoshioka | ........... H01M 10/486 |
| | | | 429/90 |

(Continued)

FOREIGN PATENT DOCUMENTS

| EP | 2871695 A1 | 5/2015 |
| FR | 3062956 A1 | 8/2018 |

(Continued)

OTHER PUBLICATIONS

International Search Report for Application No. PCT/FR2022/051195 dated Oct. 11, 2022, 2 pages.

(Continued)

*Primary Examiner* — Neil Abrams
(74) *Attorney, Agent, or Firm* — TraskBritt

(57) ABSTRACT

A device for connecting a U-shaped terminal of a battery module to an electrical conductor includes a longitudinal insulation body having at least one housing for receiving the terminal; a flexible electrical conductor disposed in the longitudinal insulation body, the electrical conductor comprising a pair of flexible contact blades configured to be arranged in the terminal and to make contact with an inner contact surface of the terminal. The device further includes at least one connecting element configured to be inserted in the connection position into the housing and between the flexible blades of the at least one pair of flexible contact blades to keep them pressed against the inner contact surface of the terminal.

16 Claims, 3 Drawing Sheets

(51) Int. Cl.
    H01R 13/115     (2006.01)
    H01R 13/631     (2006.01)

(56)         References Cited

U.S. PATENT DOCUMENTS

2017/0263911 A1*   9/2017  Gunther ................. B23K 26/21
2018/0294448 A1   10/2018  Yamane et al.

FOREIGN PATENT DOCUMENTS

WO     2010/049886 A2    5/2010
WO     2019/242917 A1   12/2019

OTHER PUBLICATIONS

International Written Opinion for Application No. PCT/FR2022/051195 dated Oct. 11, 2022, 6 pages.

* cited by examiner

DEVICE FOR CONNECTING A TERMINAL OF A BATTERY MODULE TO AN ELECTRICAL CONDUCTOR

CROSS-REFERENCE TO RELATED APPLICATIONS

This application is a national phase entry under 35 U.S.C. § 371 of International Patent Application PCT/FR2022/051195, filed Jun. 20, 2022, designating the United States of America and published as International Patent Publication WO 2023/002100 A1 on Jan. 26, 2023, which claims the benefit under Article 8 of the Patent Cooperation Treaty of French Patent Application Serial No. FR2107980, filed Jul. 23, 2021.

TECHNICAL FIELD

The present disclosure relates to a connection device for electrically connecting a terminal of a battery module to an electrical conductor. This conductor can make it possible to electrically connect several modules to one another. The present disclosure finds a very particular application in the field of electric vehicles.

BACKGROUND

In high-voltage electrical energy storage systems, in particular, those used in electric vehicles, it is usual to combine several battery cells to form individual battery modules. Each module usually comprises two terminals having different poles. The battery modules are connected to one another, that is placed in electrical contact with one another, via a busbar generally made of copper.

Usually, a busbar is screwed or soldered to the terminals of the modules to which it connects. However, this type of connection is not robust with respect to the variations in positions of the terminals, which can be induced by a relative movement of the battery modules or result from manufacturing tolerances. Thus, the connection is not reliable and there may be risks of breakage or an imperfect electrical connection.

The document U.S. Pat. No. 9,698,402 discloses a connection device in which the busbar is deformed during mounting in order to take into account the positional deviations existing between the terminals, is clipped, and then is soldered to the terminals. However, as is the case for the assembly methods using screwing, this method is restrictive and requires a relatively long installation time.

It is therefore desirable to have a connection device that is simple to implement and has a tolerance to the positional deviations of the terminals.

The document WO2019242917 discloses a connection device that can be plugged onto terminals. Two retaining clips make it possible to form an electrical contact between a flexible busbar and the terminals. The assembly is disposed in an insulating longitudinal body.

However, this device is not robust with respect to variations in position that occur after assembly. Indeed, once assembled, if one of the modules moves relative to the other, stresses are exerted at the joints between the busbar, the terminals, and the retaining clips. These stresses can impair the electrical quality and the reliability of the connection.

Also known from document EP2871695 is a connection device specifically adapted to terminals of cylindrical shape.

The busbar is provided with openings through which tubular connection elements are inserted, ensuring the joint between the busbar and the terminals.

It would be desirable to have a durable connection device having a large tolerance to the relative changes in position of the terminals, without impairing the reliability and the electrical quality of the connection. More particularly, it would be desirable to have a connection device that functions for U-shaped terminals.

BRIEF SUMMARY

One aim of the present disclosure is to propose a connection device that is simple to implement, is compatible with U-shaped terminals, and is particularly robust with respect to the variations in position of the terminals.

In order to achieve this object, the subject matter of the present disclosure proposes a device for connecting a terminal of a battery module to an electrical conductor, the terminal having a U-shape defining an inner contact surface, the connection device comprising:

a longitudinal insulation body having at least one housing for receiving the terminal, the longitudinal body having, on a first face, a first opening for insertion of the terminal into the housing and, on a second face opposite the first, a second opening for insertion of a connecting element, the second insertion opening opening out in the housing;

a flexible electrical conductor disposed in the longitudinal body, the electrical conductor comprising at least one pair of flexible contact blades intended to make contact with the inner contact surface of the terminal;

at least one connecting element configured to be inserted in the connection position into the second insertion opening and between the flexible blades of the at least one pair of flexible contact blades in order to keep them pressed against the inner contact surface of the terminal.

According to other advantageous and non-limiting features of the present disclosure, either individually or in any technically feasible combination:

the housing is disposed at a first end of the longitudinal body;

the longitudinal body comprises a second end opposite the first and wherein the electrical conductor extends from the first end to the second end;

the second end comprises a second housing for receiving a second terminal, the longitudinal body having, on its first face, two first openings for insertion of the terminals into their respective housings and, on the second face, two second openings for insertion of connecting elements, the two second insertion openings respectively opening out in the housings;

the longitudinal body comprises two shells distinct from each other, each shell comprising one of the housings, and a connecting bridge configured to be clipped onto the two shells and to connect them to each other in an articulated manner;

each shell comprises two guide grooves respectively disposed on lateral flanks of the shell and the connecting bridge is provided with at least two pairs of studs, each pair of studs being intended to slide and/or pivot in the guide grooves of one of the shells;

the element comprises a head serving as a bearing surface for moving the element translationally through the second insertion opening and a foot intended to be inserted between the flexible blades of the pair of flexible contact blades;

the foot is provided at its free end with a contact spring intended to exert a permanent tension on the flexible contact blades in order to keep them pressed against the inner contact surface of the terminal when the connecting element is in the connection position;

the connection device comprises a visual locking indicator of the connecting element, the visual locking indicator being disposed in the longitudinal body;

the visual locking indicator comprises a part that can move translationally in the longitudinal body when the connecting element is inserted in the connection position into the second insertion opening, and the longitudinal body comprises an aperture through which at least a portion of the visual locking indicator is able to be seen;

the part bearing the visual locking indicator comprises at least one stop and the connecting element comprises at least one coupling element for coming into contact against the stop and progressively moving it during its insertion in the connection position;

the connecting element comprises a contact strip capable of electrically connecting two terminals of the battery module to each other when the connecting element is in the connection position;

the longitudinal body comprises retaining catches in order to fit elastically onto retaining elements of the battery module;

the connecting element comprises blocking means in order to prevent the disengagement of the retaining notches from the retaining elements of the module when the element is in the connection position;

the connecting element comprises means for locking to the longitudinal body when the element is in the connection position;

the electrical conductor comprises a central corrugated portion.

BRIEF DESCRIPTION OF THE DRAWINGS

Other features and advantages of the present disclosure will emerge from the following detailed description of the present disclosure with reference to the appended figures, in which.

Some figures include schematic depictions, which, for the sake of readability, are not to scale.

DETAILED DESCRIPTION

Figure 1:
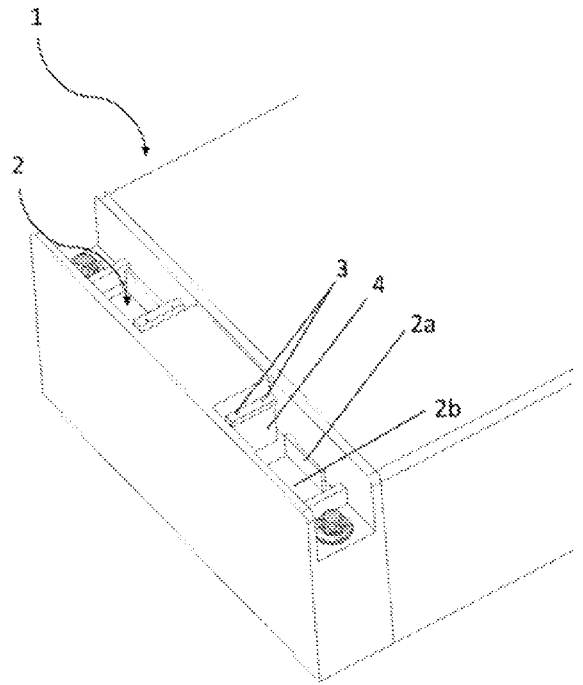
FIG. 1 shows an example of a module illustrating U-shaped terminals that are compatible with a fastening device according to the present disclosure.
Figure 4:
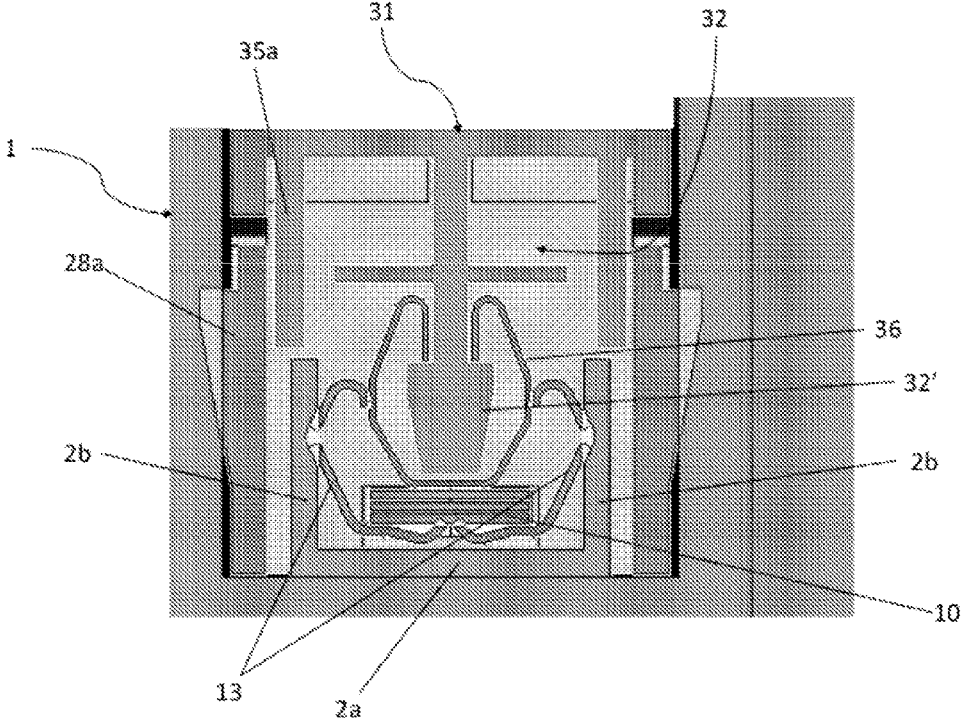
FIG. 4 is a cross-sectional view of one end of a connection device, assembled to a terminal, according to the present disclosure.

In the preamble, it is specified that the connection device 100, which is the subject matter of the present description is configured to interact with battery modules 1 having U-shaped terminals 2 (clearly visible in FIG. 4). The inner surface of the U defines an inner contact surface of the terminal. An example of such a module is shown in FIG. 1. Each terminal thus comprises two uprights 2b connected to each other by a base 2a. This U-shape makes it possible to increase the contact surface with an electrical conductor 10 of the connection device 100 and allows an improved electrical connection quality compared with a connection established with a terminal of the "single upright" type.

Figure 3:
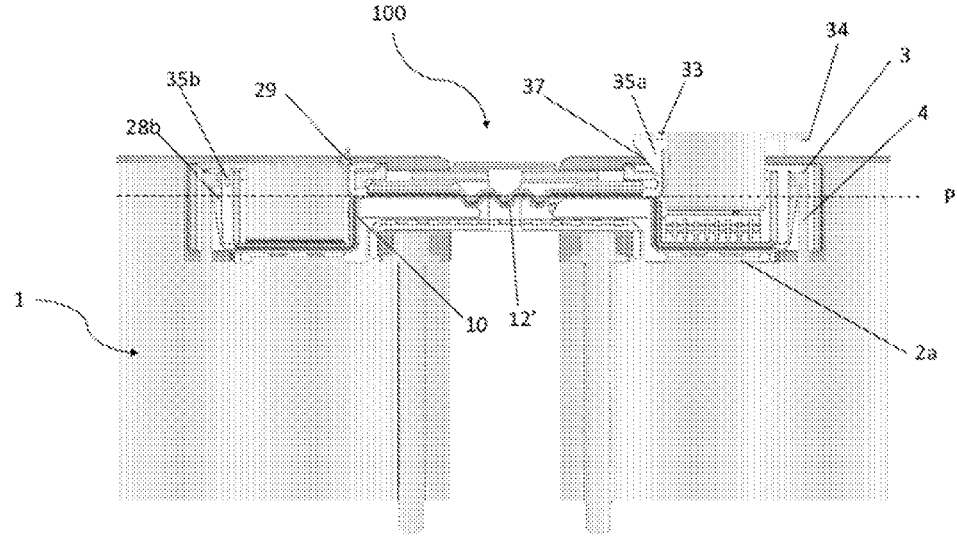
FIG. 3 is a longitudinal cross-sectional view of a connection device according to the present disclosure.

The battery modules 1 can comprise, associated with each terminal 2, two terminals 3 of a high-voltage interlock loop (HVIL) circuit enabling the presence of a connection device 100 to be detected. In the embodiment shown in FIG. 1, these HVIL terminals 3 are disposed on supports 4 respectively associated with the terminals of the battery module 1 but other configurations are also possible. As will be detailed in a subsequent section of this description, a connection device 100 according to the present disclosure can comprise a conductive contact strip 34 (FIG. 3), which, when the connection device 100 is correctly assembled to a terminal, also electrically connects the two terminals 3 of the HVIL circuit to each other. It is thus possible to detect the presence of a connection device 100 at each terminal of the battery modules. This information, or information to the contrary, can, for example, be exploited by a vehicle computer and can be made visible via an indicator lamp on the dashboard of this vehicle.

The presence of this HVIL circuit and/or of the contact strip of the connection device is of course not necessary for the proper functioning of a connection device according to the present disclosure.

General Description of the Connection Device

Figure 2:
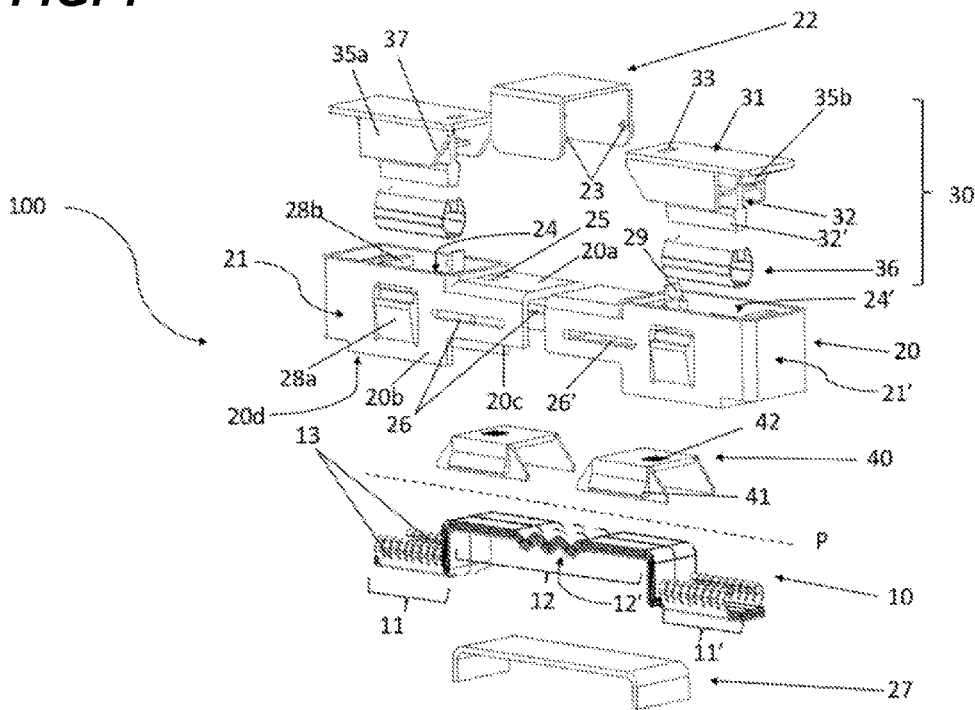
FIG. 2 is an exploded view of a connection device according to the present disclosure.

FIG. 2 shows an exploded view of a connection device 100 according to the present disclosure.

This connection device 100 comprises a longitudinal insulation body 20, a flexible electrical conductor 10 housed in the longitudinal body 20, and two connecting elements 30.

The longitudinal body 20 is formed from an insulating material, such as a plastic material, and serves to protect and electrically insulate the electrical conductor 10. It has two terminal-receiving housings 24, 24' respectively disposed at a first and a second end of the longitudinal body 20. For each housing, the longitudinal body 20 has, on a first face 20d, a first opening for insertion of a terminal, making it possible to place a terminal in the housing 24, 24' when the connection device is plugged onto a battery module. It also has, on a second face 20a opposite the first face 20d, a second opening for insertion of an element 30, the second opening out in the housing 24, 24'.

The electrical conductor 10 is used to electrically connect two terminals to each other. It is disposed in the longitudinal body 20 and, in the embodiment described, extends from the first end to the second end of the longitudinal body 20. It occupies at least part of the housings 24, 24'. In order to allow the connection with each of the terminals, the electrical conductor 10 comprises at each of its ends 11, 11' a plurality of pairs of flexible contact blades 13, each blade of a pair of blades facing the other. The plurality of pairs of flexible contact blades 13 is intended to be disposed in compression in the U of a terminal and to make contact with the inner contact surface of this terminal 2.

The role of the elements 30 is to ensure and maintain the electrical contact between the electrical conductor 10 and the terminals 2. They are each configured to be inserted into the second insertion openings of the longitudinal body 20 in order to occupy the housing. In this so-called "locking"

position, the elements 30 press and hold the flexible contact blades 13 against the inner contact surface of the terminal 2.

Optionally, the connection device 100 can comprise visual locking indicators 40 of the elements 30. Each visual locking indicator 40 comprises, in the embodiment shown, a U-shaped part disposed astride the electrical conductor. A visual locking indicator 40 is moved translationally along the electrical conductor by the element 30 during its insertion. The indicator is made visible through an aperture 25 formed on the longitudinal body 20, only when the element 30 is in the connection position.

The indicator can be of any color, including yellow, green, red, white, blue, black, orange, violet making it possible to make it particularly visible in its environment. The indicator can include a reflective tape disposed on the U-shaped part or a sticker or printed information displaying a pattern, color, barcode, reflective material, or label or alphanumeric message.

In some embodiments, the indicator comprises a code, such as a one-dimensional barcode (for example, UPC code, EAN code, code 39, code 128, ITF, code 93, codabar, GS1 databar, MSI Plessey, etc.), a two-dimensional barcode (for example, QR code, datamatrix code, PDF417, AZTEC, etc.), a holographic code, a human-readable alphanumeric code, other codes known in the art and interpretable by a machine equipped with a viewing device and/or by an operator.

DETAILED DESCRIPTION OF AN EMBODIMENT

In the embodiment shown in the figures, the longitudinal body 20 is formed by two shells 21, 21' distinct from each other, in order to protect and electrically insulate the electrical conductor 10. Each shell 21, 21' defines a housing 24, 24' for receiving the terminal. The longitudinal body also comprises a connecting bridge 22, here clipped onto the two shells 21, 21', in order to connect them to each other in an articulated manner. This articulated configuration makes it possible to make the longitudinal body 20 flexible in order to better accompany the deformations of the electrical conductor 10.

The shells 21, 21' comprise guide grooves 26, 26' respectively disposed on their lateral flanks 20b, 20c. The guide grooves extend along the main axis P, as can be seen in FIG. 2. The connecting bridge 22 is provided with at least two pairs of studs 23 (a single pair being visible in FIG. 2), each pair of studs 23 being intended to slide and/or pivot in the guide grooves 26, 26' of one of the shells 21, 21'.

The longitudinal body 20 can also comprise a lower cover 27. This lower cover 27 can be assembled, for example, by clipping, to the two shells 21, 21' without impeding their relative movement.

The electrical conductor 10 comprises a flexible central portion 12, forming a busbar and extending along a main axis P. The electrical conductor 10 comprises contact means at each of its ends 11, 11', as described above, in the form of a plurality of pairs of flexible contact blades 13 in the embodiment shown. The blades of these pairs of blades are face-to-face and are disposed on either side of the main axis P. The blades are curved outwardly so that they can be inserted, in compression, into the U of each terminal and come into contact with their inner contact surface.

Figure 5A:
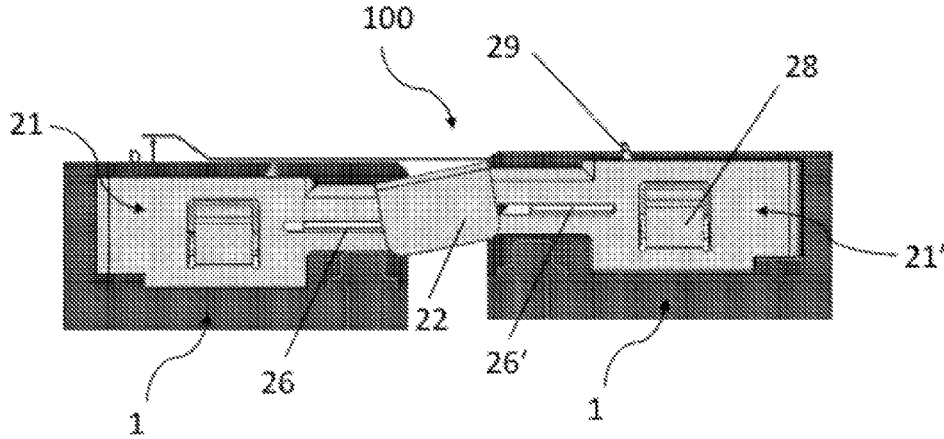
FIGS. 5A, 5B, 5C show a connection device according to the present disclosure adapted to different types of positional deviation between two terminals.
Figure 5B:
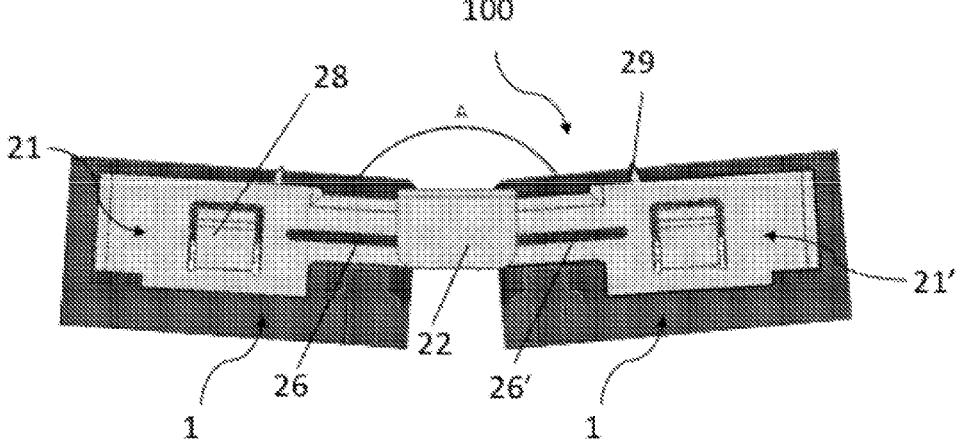

In the embodiment shown, the central portion 12 of the electrical conductor 10 is raised relative to its two ends 11, 11' in order to form a bearing. But this feature is not essential to the proper functioning of the connection device 100. The central part comprises a "wavy" or corrugated section 12' in order to improve its flexibility and to localize the stresses therein, for example, those related to the longitudinal expansion of the conductor. The flexible nature of the electrical conductor aims to compensate for the variability in the relative positions of the ends 11, 11', which results from the variability in the parallelism and/or co-linearity and/or distance between the various modules to which the connection device 100 connects. The electrical conductor 10 can thus deform without impairing the electrical contact, which is formed between the flexible contact blades 13 and the terminals. Thus, the electrical conductor 10 can deform at the wavy section 12' in order to compensate for the positional deviations d between the two terminals along the main axis P by compressing or extending (FIG. 5C), deviations in height D (FIG. 5A), and deviations in angular orientation A (FIG. 5B). It should be noted that the longitudinal body is able to accommodate the deformations of the electrical conductor.

The busbar, forming the central portion of the electrical conductor 10, can be formed from any flexible conductive element, for example, in the form of a plurality of conductive sheets stacked one on top of the other and able individually to slide on one another, in order to improve the flexibility properties of the electrical conductor 10. The busbar is advantageously made of copper but can also be formed from or comprise any other conductive material such as aluminum or nickel.

Continuing the description of the embodiment shown in FIG. 2, an element 30 comprises a head 31 as well as a foot 32, made of an electrically insulating material. The head 31 serves as a bearing surface for moving the element 30 translationally through the second insertion opening 24. The foot 32, more particularly its end, is intended to be inserted between the blades of the pair of flexible contact blades 13 of the electrical conductor 10 in order to keep them pressed against the inner contact surface of the terminal. The foot 32 makes it possible, in particular, to press the electrical conductor 10 against the base 2a of the terminal 2.

The foot 32 is advantageously provided at its free end with a conductive or non-conductive part, forming a contact spring 36, for example, made of steel. This contact spring 36 exerts a permanent tension on the flexible contact blades 13 in order to keep them pressed against the inner contact surface of the terminal when the connecting element 30 is in the connection position. The end of the foot 32 comprises inclined planes 32' for guiding the spacing of the arms of the contact spring 36 and facilitating its assembly with the foot 32 of the element 30.

Advantageously, the connection device is provided with means for locking the element 30 in the connection position on the longitudinal body 20. In the example shown, the head 31 of the element comprises a locking opening 33 and the longitudinal body 20 comprises a locking catch 29 intended to fit elastically into the locking opening 33 when the element 30 is in the connection position.

As described above, the connection device 100 can comprise two visual locking indicators 40 disposed in the longitudinal body 20. It will be recalled that, when a visual locking indicator 40 is provided, the longitudinal body 20 comprises an aperture 25 disposed on its second face 20a, making it possible to expose and make visible a good-connection indicator, for example, a colored portion or a code, only when the element 30 is in the connection position.

Each visual locking indicator 40 is formed by a part that can move translationally in the shell 21, 21' wherein it lies, along the main axis P. In the embodiment shown, the part has a U-shape and is disposed astride and above the electrical conductor. Regardless of the shape of the part forming the visual indicator 40, the latter can comprise at least one stop 41 intended to come into contact with a coupling element of the element 30, here an inclined plane 37 formed on fins. These two elements are arranged so as to come into contact with one another when the connecting element 30 is inserted into the second insertion opening 24, 24' in order to occupy the connection position. This contact makes it possible to progressively move the visual locking indicator 40 as the element is inserted into the connection position.

It is possible to provide the connection device 100 with a restoring element (not visible in the figures), such as a spring, to return the part bearing the visual locking indicator 40 to the initial position when the element 30 is extracted from the housing.

As mentioned above, the connecting element can comprise a contact strip 34, here disposed on the lower surface of the head of the element. This strip is arranged on the element in order to electrically connect the two terminals 3 of the battery module 1 to each other and close the HVIL circuit when the connecting element 30 is in the connection position.

In order to be able to retain the longitudinal body 20 assembled to the battery module 1, the longitudinal body 20 is advantageously provided with retaining catches 28a, 28b in order to fit elastically into retaining elements of the battery module 1. In the embodiment shown, the longitudinal body is provided with external retaining catches 28a disposed on its external surface, and inner retaining catches 28b disposed in the housings 24, 24'. The inner retaining catches 28b here engage in the support 4 of the battery module carrying the terminals 3 of the HVIL circuit, but other configurations are of course possible.

Advantageously, the head 31 comprises blocking means 35a, 35b preventing the disengagement of the retaining catches 28a, 28b from the retaining elements of the battery module when the element 30 is in the connection position. In the embodiment shown, these means are formed by a tongue 35b and a fin 35a arranged on the lower surface of the head 31 and extending perpendicularly to the latter. The tongue 35b is inserted behind the inner retaining catch 28b of the longitudinal insulation body 20 (FIG. 3) and the fins 35a, 35b behind the external retaining catches 28a (FIG. 4), thus preventing their removal.

Implementation of the Connection Device

In a step of pre-assembling the connection device 100, the connecting bridge 22 is assembled on the two shells 21, 21' by inserting the pairs of studs 23 into the guide grooves 26, 26' of the shells. The electrical conductor 10 is disposed in the longitudinal body 20, then the lower cover 27 is assembled to the shells 21, 21' in order to more completely encapsulate the electrical conductor 10. The elements 30 are pre-disposed through the second insertion openings, without however being fully pushed into the housings 24, 24'. The connection device is thus assembled in a so-called "delivery" configuration.

Figure 5C:
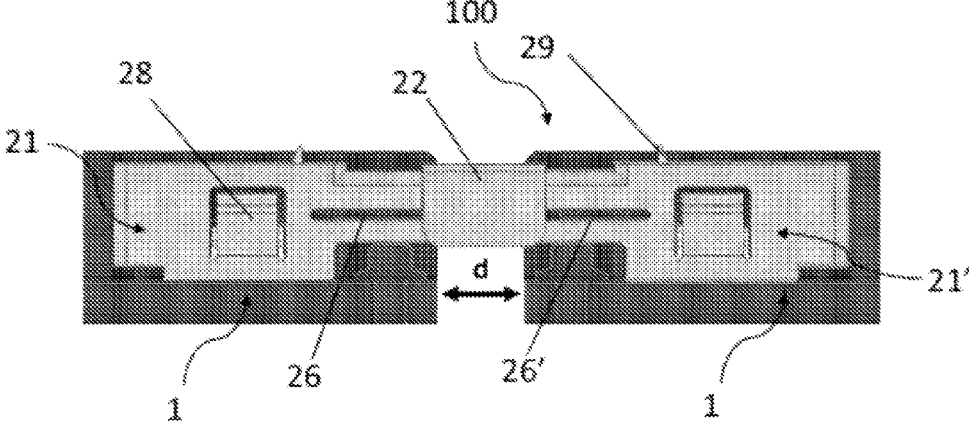

In an assembly step, the connection device 100 is positioned above the two battery modules so as to best align each first insertion opening with a terminal of a module. The connection device 100 is plugged onto the two battery modules in order to cause the terminals to penetrate, through the first insertion openings, into the housings 24, 24'. The retaining catches 28a, 28b are clipped onto the retaining elements of the battery modules. The ends 11, 11' (the two pairs of contact blades) of the electrical conductor 10 are respectively housed in the Us of the terminals and come into electrical contact with these terminals. During this step, the electrical conductor 10 can optionally deform at its central portion 12 and the shells 21, 21' move relative to each other, in order to conform to the exact relative position of the two terminals, as shown in FIGS. 5A, 5B, and 5C.

In a subsequent connection step, a pressure is applied to the head 31 of each element 30 in order to push them completely through the second insertion openings so that they occupy the housings 24, 24' in the connection position. During this step, the contact spring 36 bears on the flexible contact blades 13 in order to press them against the inner contact surface of the terminal 2. Simultaneously, the inclined planes 37 of the element 30 come into contact against the stops 41 of the U-shaped parts of the visual locking indicators 40 in order to progressively move it. The blocking means 35a, 35b progressively become inserted behind the retaining catches 28a, 28b and the locking means of the element 30 engage on the longitudinal body 20.

At the end of this step, the connection device 100 is in the connection position, the elements 30 forcing the electrical contact between the electrical conductor 10 and the terminals. The permanent tensions of the contact springs 36 are applied to the flexible contact blades 13 in order to keep them pressed against the inner contact surfaces of the terminals. A high-quality electrical contact between the electrical conductor 10 and the terminals 2 is thus ensured in all circumstances. The means for locking the elements on the longitudinal body 20 are engaged. The blocking means 35a, 35b are inserted behind the retaining catches 28a, 28b and block their disengagement. The indicator 42, for example, a code, is entirely visible through the aperture 25 and gives a visual indication of the proper locking of the connection. The contact strip 34 electrically connects the two terminals 3 in order to close the HVIL circuit and allow the circulation of an electrical good-connection signal.

It will be noted that, in the event of one of the battery modules moving, the electrical conductor 10 can deform and the longitudinal insulation body 20 hinge (FIGS. 5A, 5B, 5C) in order to accommodate this movement without affecting the electrical contact existing between the flexible contact blades 13 and the terminals 2.

If it is desired to disconnect one of the battery modules, it is sufficient to apply a force on the locking catch 29 in order to dislodge it from the locking opening 33 and release the movement of the element 30 so as to extricate it from the housing 24, 24', and finally release the retaining catches 28a, 28b.

As will be readily understood, the present disclosure is not limited to the described embodiment, and it is possible to add variants thereto without departing from the scope of the invention as defined by the claims.

Thus, and although a connection device extending along a main axis P has been described and illustrated here, it is of course possible to envisage other configurations, U-shaped, L-shaped, or in any shape in order to allow other connection arrangements between two battery modules, depending on the relative arrangement of the battery modules between them.

The invention claimed is:

1. A device for connecting a terminal of a battery module to an electrical conductor, the terminal having a U-shape defining an inner contact surface, the connection device comprising:

a longitudinal insulation body wherein the electrical conductor is disposed, the longitudinal insulation body having at least one housing for receiving the terminal, the longitudinal insulation body having on a first face a first opening for insertion of the terminal into the housing and, on a second face opposite the first face, a second opening for insertion of a connecting element, the second insertion opening opening out in the housing;

the electrical conductor being flexible and comprising at least one pair of flexible contact blades configured to be arranged in the U of the terminal and to make contact with the inner contact surface of the terminal; and at least one connecting element configured to be inserted in a connection position into the second insertion opening and between the flexible contact blades of the at least one pair of flexible contact blades to keep the flexible contact blades pressed against the inner contact surface of the terminal.

2. The connection device of claim 1, wherein the housing is disposed at a first end of the longitudinal insulation body.

3. The connection device of claim 2, wherein the longitudinal insulation body comprises a second end opposite the first end and wherein the electrical conductor extends from the first end to the second end.

4. The connection device of claim 3, wherein the second end comprises a second housing of a second terminal, the longitudinal insulation body having, on its first face, two first openings for insertion of the terminals into their respective housings and, on the second face, two second openings for insertion of connecting elements, the two second insertion openings respectively opening out in the housings.

5. The connection device of claim 4, wherein the longitudinal insulation body comprises:

two shells distinct from each other, each shell comprising one of the housings; and a connecting bridge configured to be clipped onto the two shells and to connect the two shells to each other in an articulated manner.

6. The connection device of claim 5, wherein:

each shell comprises two guide grooves respectively disposed on lateral flanks of the shell; and the connecting bridge has at least two pairs of studs, each pair of studs being configured to slide and/or pivot in the guide grooves of one of the shells.

7. The connection device of claim 1, wherein the at least one connecting element comprises:

a head defining a bearing surface for moving the element translationally through the second insertion opening; and, a foot configured to be inserted between the flexible blades of the pair of flexible contact blades.

8. The connection device of claim 7, wherein the foot is provided at its free end with a contact spring configured to exert a permanent tension on the flexible contact blades to keep them pressed against the inner contact surface of the terminal when the connecting element is in the connection position.

9. The connection device of claim 1, further comprising a visual locking indicator of the at least one connecting element, the visual locking indicator being disposed in the longitudinal insulation body.

10. The connection device of claim 9, wherein:

the visual locking indicator comprises a part configured to move translationally in the longitudinal insulation body when the connecting element is inserted in the connection position into the second insertion opening; and the longitudinal insulation body comprises an aperture through which at least a portion of the visual locking indicator is exposed to the exterior.

11. The connection device of claim 9, wherein:

the part of the visual locking indicator comprises at least one stop; and the at least one connecting element comprises at least one coupling element for coming into contact against the stop and progressively moving the stop during insertion of the at least one connecting element into the connection position.

12. The connection device of claim 1, wherein the at least one connecting element comprises a contact strip configured to electrically connect two terminals of the battery module to each other when the at least one connecting element is in the connection position.

13. The connection device of claim 1, wherein the longitudinal insulation body comprises retaining catches configured to fit elastically onto the retaining elements of the battery module.

14. The connection device of claim 13, wherein the connecting element comprises blocking means configured to prevent disengagement of the retaining catches from the retaining elements of the module when the at least one connecting element is in the connection position.

15. The connection device of claim 1, wherein the at least one connecting element comprises means for locking to the longitudinal insulation body when the at least one connecting element is in the connection position.

16. The connection device of claim 1, wherein the electrical conductor comprises a corrugated central portion.

* * * * *